United States Patent

[11] 3,610,894

| [72] | Inventors | Geoffrey Stuart Drury;<br>Norman Jamieson MacLeod; Jack Allenby;<br>Gregory Charles Wilson, all of York,<br>England |
|---|---|---|
| [21] | Appl. No. | 24,436 |
| [22] | Filed | Apr. 8, 1970 |
| [45] | Patented | Oct. 5, 1971 |
| [73] | Assignee | British Railways Board<br>London, England<br>by said Macleod, Allenby and Wilson |
| [32] | Priority | Nov. 23, 1965 |
| [33] |  | Great Britain |
| [31] |  | 49,674/65<br>Continuation of application Ser. No.<br>561,455, June 29, 1966, now abandoned. |

[54] PEAK ANALYSIS SYSTEMS
7 Claims, 3 Drawing Figs.

[52] U.S. Cl. .................................................. 235/92 NT,
340/347 AD, 235/92 EA, 235/92 EL, 235/183
[51] Int. Cl. ...................................................... H03k 13/20
[50] Field of Search ............................................ 235/92,
151, 183; 340/347

[56] References Cited
UNITED STATES PATENTS

| 3,230,358 | 1/1966 | Davis et al. | 235/183 |
| 3,185,820 | 5/1965 | Williams et al. | 235/92 |
| 3,333,090 | 7/1967 | Neer | 235/183 |
| 3,360,636 | 12/1967 | Ramsay et al. | 235/92 |
| 3,412,241 | 11/1968 | Spence et al. | 235/183 |

Primary Examiner—Maynard R. Wilbur
Assistant Examiner—Joseph M. Thesz, Jr.
Attorney—Sommers & Young ABSTRACT: A peak analysis system for analyzing the peaks and troughs of a variable comprising an analog-to-digital converter for producing a train of impulses, each impulse digitally representing a predetermined incremental variation of the variable, a digital counting system for counting the impulses from the converter and a resetting circuit for resetting the counting system in response to a reversal of trend in the variable, and recording means responsive to the count made by the counting system between successive resetting operations for recording a digital value related to the count.

PATENTED OCT 5 1971

3,610,894

SHEET 1 OF 2

Inventors
Geoffrey S. Drury,
Norman J. Macleod,
Jack Allenby,
Gregory C. Wilson
by Sommers & Young
Attorneys

PEAK ANALYSIS SYSTEMS

This application is a continuation of application Ser. No. 561,455, filed June 29, 1966, now abandoned.

The present invention relates to peak analysis systems, for example a statistically weighted peak analyzer for analyzing peaks and/or troughs in a variable under investigation.

Figure 1:
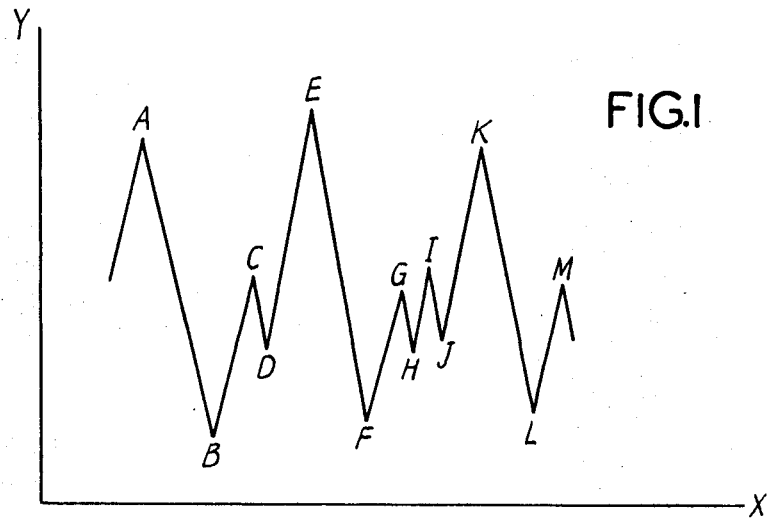

It is often necessary to obtain a statistical analysis of fluctuating measurements by reference to maxima and minimal about a datum point. These events are often portrayed as a graphical record as shown in FIG. 1 and clerical analysis may be performed by direct measurement of the peaks and troughs. The Y-ordinate may be divided into bands and the incidence of the peaks and troughs, A to M in FIG. 1 recorded in the appropriate band. To each band a statistical weighting may be applied and in any period covered by the X-distance the number of peaks or troughs occurring in any band may be multiplied by the appropriate loading for that band. This is a common practice in statistical analysis and apparatus already exists capable of performing this task electronically and electromechanically.

Such known apparatus, however, suffers from the disadvantage that where a datum is not fixed, but can itself change, little or no provisions can be made save to introduce a time constant controlled adjustment to the level representing the datum. This is in some circumstances satisfactory but where the parameter X itself does not always change at the same rate with passage of equal periods of time, large errors can appear.

A principle object of this invention is to overcome this disadvantage, and accordingly in the peak analysis system of the present invention an incremental counting system is provided to evaluate the displacement of the variable under investigation between successive peaks and troughs, the counting system being reset at each or predetermined reversals of the direction (i.e. the trend) of the variable under investigation. Thus a measurement of displacement of the variable is only made from peak to peak or trough to peak as required and long term changes in the datum are thus eliminated or rendered ineffective.

A further disadvantage is that, where the system of measurement of the Y-parameter contains mechanical components, there is often an error introduced by mechanical vibrations present in the system due to characteristics not always associated with the parameter being measured e.g. the presence of vibrations caused by other machinery in close proximity to the measuring apparatus etc. These manifest themselves as minor peaks and troughs in the course of a major transit; for example as the transient A'A in the transition XB of FIG. 2. This is of small consequence in relation to XB but in a sensitive peak analysis equipment would serve to break up the measurement into XA', A'A, and AB. This would give an erroneous result if the statistical weightings of the Y-axis band were nonlinear as is often the case. Likewise BB' and the trace BC would show a series of peaks of small magnitude instead of a single peak for analysis. It is therefore desirable to be able to control the level at which the minor peaks are accepted as valid in the assessment of the graph as a whole.

According to a further feature of the invention, the linear incremental counting system is arranged to be controlled so that unless a predetermined count has been reached between successive reversals of direction of the variable one or other or both of the said successive reversals is not accepted as a peak.

Figure 2:
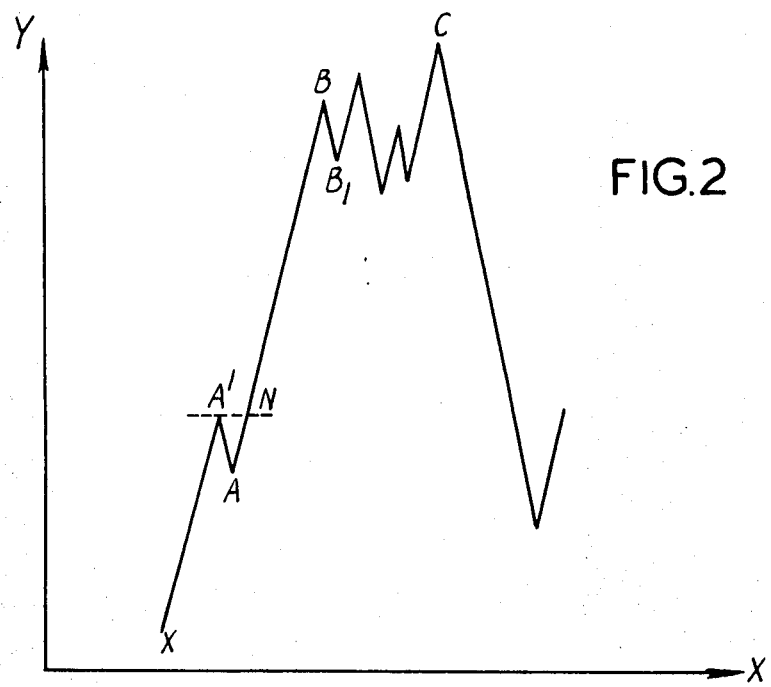
Figure 3:
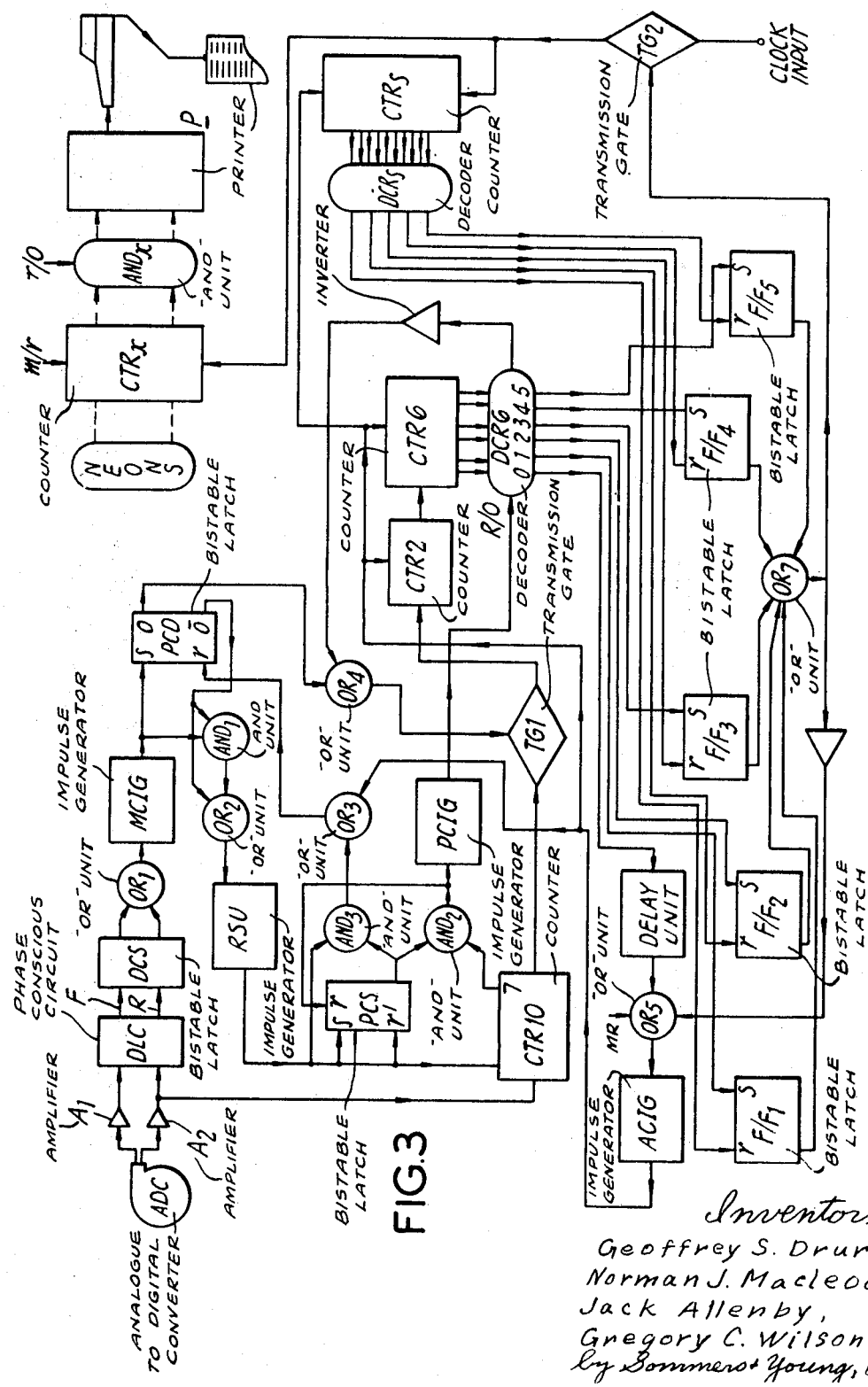

Further features of the invention will be readily understood from the peak-recording apparatus in accordance with the invention now to be described by way of example with reference to the accompanying block circuit diagram designated FIG. 3, reference being made also to the aforementioned FIGS. 1 and 2 in explaining operation of the peak recording apparatus. Each of the blocks in the circuit diagram of FIG. 3 is a known circuit configuration as will be readily appreciated from the ensuing description.

In the diagram ADC is an analogue to digital converter which generates a series of electrical impulses in discrete steps as the parameter whose peaks are to be recorded, i.e. the Y-parameter in FIGS. 1 and 2, changes. Thus a count of these impulses will be a measure of change in Y-value. The converter ADC is arranged to be direction conscious by generating two trains of impulses 90° out of phase with each other, each train being on an electrically separate line. The two signal amplifiers $A_1$ and $A_2$ may be inserted if required and merely serve to amplify the signals to a level suitable for logical analysis.

The two trains of signals are fed into a phase conscious circuit DLC and this circuit then analyses the sequence of the signals and presents its output as a train of impulses on one of two lines F and R according to whether the Y-parameter is increasing (F) or decreasing (R). The two lines F and R are taken to a bistable latch DCS which is set by an output on line F and reset by an output on line R. Bistable latch DCS has its output connected through OR unit $OR_1$ to a motion change impulse circuit MCIG which generates one impulse only each time the state of bistable latch DCS changes and hence each time the output of DLC changes from line F to line R or vice versa. It will be seen therefore that each time the Y-parameter alters its direction or trend, i.e. reaches a peak or a trough, an impulse is generated by the circuit MCIG to indicate this change in direction or trend. This impulse will be referred to as the motion change impulse.

One of the amplified incremental signals, that shown coming from $A_2$ in the diagram, is taken to a scale of 10-counter CTR 10. Any scale may be used but in this description a scale of 10 is used. Thus for every 10 impulses coming into the counter CTR 10 one output signal emerges. Thus the counter CTR 10 acts as a divider, dividing the incoming impulses by 10. Also coming from the counter 10 is a tap referenced 7 which allows every seventh impulse to be extracted. This tap may be placed at any point in the scale at the will of the designer e.g. 6, 7, 8, 9, etc. The purpose of this tap will be described later. Provision is made on the counter CTR 10 to reset it by sending an impulse into the terminal labeled $r$. This will cause the counter CTR 10 to reset to zero each time the impulse arrives, irrespective of the status of the counter CTR 10 at the time.

The output from the scale of 10-counter CTR 10 forms an input to transmission gate $TG_1$, which is controlled through OR unit $OR_4$ in such manner that when an input appears on $OR_4$ transmission gate $TG_1$ is closed and the output from counter CTR 10 is not passed to scale of 2-counter CTR 2 (once again this scale is selected for mensural convenience but may be any scale, or even omitted). The scale of 2-counter CTR 2 has a reset facility through reset terminal $r$ similar to the scale of 10-counter CTR 10.

The output of the scale of 2-counter CTR 2 is taken to a scale of 6-counter CTR 6; the scale of 6 is again selected for mensural reasons but the scale can be set at any desired level. This counter CTR 6 is used to divide the Y-axis up into a zero or "PERFECTION" band and five analytical levels of equal spacing; the number of analytical levels and their spacing may, of course, be any value desired, five equally spaced ones having been specified merely for the purposes of the exemplary embodiment. Now it will be seen that the counter CTR 6 will show by each output impulse the transit of the Y-parameter according to the scale of 120 incremental impulses coming from the converter ADC. The state of the counter CTR 6 is interpreted by a decoder DCR 6. In this exemplary embodiment, when the counter CTR 6 is full an output is fed from decoder DCR 6 to OR unit $OR_4$ via inverter I to close transmission gate $TG_1$ and so prevent counter CTR 6 recycling to zero. Under these circumstances a maximum peak is recorded, which, while it may not be a true measure of the peak, suffices for the purposes of the analysis.

If an electrical impulse in response to the occurrence of a peak as will be described is sent to the R/O (readout) terminal of DCR 6, it will read out the state of the counter CTR 6 existing, i.e. the accumulated count since the last readout.

If the output of DCR 6 appears at the terminal designated O this indicates that the peak lies in the zero or "PERFEC- TION" band and no further record of it is made. If the output of DCR 6 appears at one of the terminals designated 1, 2, 3, 4 or 5, this indicates that the peak lies in one of the analytical levels and must be programmed further through the analyzer. This is effected by the output of decoder DCR 6 setting on the appropriate one of the latches $F/F_{1-5}$. The latches $F/F_{1-5}$ are bistable circuits well known to logic designers as is the decoder DCR 6. Any one of these latches will, on being set on, send a control signal to the transmission gate $TG_2$ through OR unit $OR_7$ and this gate when signalled to do so, will allow the clock pulses arriving at the point labeled CLOCK INPUT to go to both the accumulator $CTR_x$ and the scaler $CTR_s$, which are both counting circuits of the type well known to digital circuit designers, and they will begin counting. The scaler has a decoder $DCR_s$ which has output terminals on which appears in sequence an output signal at the appropriate statistical values for the levels represented by the outputs of CTR 6 as determined by the number of clock pulses fed to scaler counter $CTR_s$. These output terminals are connected to the reset terminals $r$ of the respective latches $F/F_{1-5}$.

Thus when the scaler $CTR_s$ has reached the count to provide the output signal on that output terminal of $DCR_s$ which is wired to the reset terminal of the one of the latches $F/F_{1-5}$ that has been set on, a signal will go from the decoder $DCR_s$ to turn that latch off. The signal to the transmission gate $TG_2$ will then be removed cutting off the clock pulses from the scaler $CTR_s$ and the accumulator $CTR_x$ and thus stopping them at the count required. The accumulator $CTR_x$ will have added to its count the same number of clock pulses as have been fed to the scaler $CTR_s$. In this way the accumulator $CTR_x$ records a peak as a precise statistical value of the analytical band in which it falls and including the desired statistical weighting as determined by the setup between decoder DCR 6 and $DCR_s$. The state of the accumulator can be indicated continuously on a neon visual display and by printer P upon a readout signal being fed to the readout terminal r/o of AND unit $AND_x$ to which the accumulator output is fed via a conventional multichannel output arrangement.

The motion change impulse circuit MCIG is wired to the set terminal $s$ of bistable latch PCD and also to the first input of AND unit $AND_1$. When a reversal of the direction of change of the Y-parameter occurs, generator MCIG generates its motion change impulse as previously described and in this embodiment this is a negative pulse. Assuming that latch PCD is in its reset state as a result of a reset signal applied at its terminal $r$, arrival of the motion change impulse from MCIG will change the latch to its set state. It is arranged that the positive-going edge, i.e. the trailing edge, of the motion change impulse sets latch PCD. When this occurs, the out terminal $o$ of latch PCD goes positive to shut off gate $TG_1$ through OR unit $OR_4$ and prevents further count pulses from reaching CTR 2 and CTR 6 which is thus frozen, while the terminal $\bar{o}$ provides a negative input to $AND_1$ and to OR unit $OR_2$, the latter causing firing of one-shot generator RSU which will consequently produce one negative pulse of predetermined duration. There is no output from $AND_1$ because the motion change impulse has finished by the time the input from latch PCD arrives.

It is arranged that the negative going edge of the pulse from generator RSU resets counter CTR 10 to zero and the positive going edge causes bistable latch PCS to be changed to the set state, (it being considered to be in the reset state before the motion change occurred). Since the counter CTR 10 has been reset by the impulse from RSU it now begins to count the deflection of the Y-parameter in the new direction. If the Y-parameter now exceeds the value such that counter receives seven impulses from converter ADC before the next change of direction occurs, indicating that the last change of direction was an acceptable peak, a negative output pulse appears at terminal 7 and thus on $AND_2$ and, since latch PCS is in its set condition this providing the second input on $AND_2$, the latter is opened to produce a negative output pulse which by its negative-going edge causes one-shot generator PCIG to produce a single negative pulse constituting the readout signal at the terminal R/O of decoder DCR 6, whereupon the chain of events previously described is set in motion. The positive-going edge of the output pulse from $AND_2$ resets latch PCS which in turn recloses $AND_2$. Under these operating conditions $AND_3$ not opened because its input direct from generator RSU has been removed by the time its input from latch PCS arrives.

On completion of the analysis latch PCD is reset by an impulse from one-shot generator ACIG routed through $OR_3$. Counters CTR 2 and CTR 6 are also reset by the impulse from ACIG fed to their reset terminal $r$. If the output of decoder DCR 6 appears on terminal O the generator ACIG is triggered by this output through the DELAY unit and OR unit $OR_5$. If the output of DCR 6 appears on any of the other terminals then resetting of the appropriate one of the latches $F/F_{1-5}$ through OR unit $OR_7$ and $OR_5$ triggers generator ACIG. OR unit $OR_5$ also has an input MR for effecting manual resetting of latch PCD. As previously stated, counter CTR 10 produces an output to counter CTR 2 after every 10th impulse from ADC. The time between the 7th impulse from ADC, triggering read out of decoder DCR 6, and the 10th impulse is sufficient to allow the above train of operations up to the resetting of latch PCD, so that by the time the first output pulse is produced by CTR 10 relating to the next peak to be measured gate $TG_1$ is open again permitting this pulse to be fed to counter CTR 2.

In the case where the traverse of the Y-parameter between successive direction changes is below the present level represented by the count of 7 in this example no output appears at terminal 7 of counter CTR 10 and so no output is available from $AND_2$. It is to be remembered that latch PCS is in the set state providing an input to $AND_2$, latch PCD, is also in the set state providing an input to $AND_1$. Thus the second motion change impulse from MCIG will provide a second input to $AND_1$ to produce an output from $AND_1$ whose negative-going edge will trigger generator RSU. The positive-going edge of the motion change impulse will arrive at the set terminal of latch PCD but will have no effect because PCD is already set.

Generator RSU will produce an output pulse whose negative-going edge will provide the second input to $AND_2$ to open the latter and thus provide an input to $OR_3$ causing resetting of latch PCD.

Generator RSU is designed to generate a longer impulse than generator MCIG so that its positive-going edge occurs later than that of generator MCIG. This edge resets latch PCS to reclose $AND_3$, the positive-going edge of whose output has reset latch PCD via $OR_3$.

Counter CTR 10 was reset by the negative edge of the impulse from generator RSU and resumes counting. The resetting of latch PCD has opened gate $TG_1$ allowing a renewed count to enter CTR 6 via CTR 2 from the value at which CTR 6 was frozen by opening the gate $TG_1$.

Referring to FIG. 2 it will be seen that this has for example prevented the point A' from being treated by the analyzer as a peak or trough unless the count of 7 has been achieved and has also prevented the point A from being treated likewise. The distance A'A has been eliminated from the linear measurement XB. However it will be seen that the linear count has been resumed from the point A and not A'. This could introduce an error by making the measurement XB greater by the amount AN (equal to A'A). Usually this error is insignificant, but if required, logic circuits may be included to eliminate this. These circuits and their arrangements are already well known to logical designers, and will not be described here.

It will be appreciated that where the operation of the analyzer described above is to be coordinated with other apparatus, the analyzer is associated with control synchronizing and timing circuits as will be readily appreciated by these skilled in the art.

The invention is applicable with special advantage to the evaluation of recording motions obtained with for example the "Matisa" graphical track recording trolley or machine and the provision of a numerical measure of railway-track condition.

We claim:

1. A system for analyzing an analog signal having random variations in amplitude by providing an output manifestation which is representative of the variation in amplitude of said signal between an instantaneous peak or instantaneous trough in the signal amplitude and the next-occurring such trough or peak respectively, the system comprising in combination, an analog-to-digital converter responsive to the variations in amplitude of said signal for producing a train of pulses with each additional pulse representing a predetermined incremental variation in amplitude only of said signal, digital counting means for counting the pulses produced by said converter, means for detecting each instantaneous trough in said signal when said signal changes from decreasing amplitude to increasing amplitude and also each instantaneous peak when said signal changes from increasing amplitude to decreasing amplitude, resetting means controlled by said detecting means for resetting said counting means in response both to the detection of said instantaneous trough and also said instantaneous peak, and output means for providing said output manifestation dependent upon the count attained by said counting means at the time of each counter resetting operation.

2. The system of claim 1 which further includes means distinctively operated in response to the attainment by said counting means of a predetermined minimum number of said pulses subsequent to the detection of an instantaneous trough or instantaneous peak by said detecting means, said further means when distinctively operated being effective to operate said output means to record a digital value relating to the count by said counting means achieved at the preceding detection of an instantaneous peak or instantaneous trough.

3. The system of claim 1 in which said resetting means includes a plurality of output-responsive means a selected one of which is operated in accordance with the count attained by said counting means.

4. The system of claim 3 which further includes a source of clock pulses, said output means being governed jointly by said plurality of output-responsive means and by said clock pulse source for producing a digital signal related to the count attained by said counting means.

5. The system of claim 2 in which said counting means comprises a first counter and at least one further serially connected counter, means for transmitting a pulse from said first counter to said further counter for counting by said further counter after a predetermined number of said first-mentioned pulses have been counted by said first counter, a gate for controlling the transmission of pulses from said first counter to said further counter, said detecting means upon detecting an instantaneous peak or instantaneous trough causing closure of said gate and the resetting of said first counter and the subsequent operation of said further means being effective to operate said recording means to record a digital value related to the count on said further counter, and said resetting circuit causing resetting of said further counter and opening of said gate after the operation of said recording means is completed.

6. The system of claim 5 which also includes means responsive to the detection of an instantaneous trough or instantaneous peak by said detecting means prior to the operation of said further means and effective thereupon to reopen said gate without resetting said further counter.

7. The system of claim 2 in which said counting means comprises first and second counters, gate control means for controlling the application of said pulses from said first counter to said second counter, said detecting means upon detecting an instantaneous peak or an instantaneous trough acting upon said gate control means to disable said second counter, and means responsive to the attainment of a predetermined count by said first counter subsequent to the detection of an instantaneous peak or an instantaneous trough by said detecting means for rendering effective said control means to produce said output and to reset said counting means.